E. B. JEWETT.
Combined Coal-Box and Fire-Iron Standard.
No. 133,780.                               Patented Dec. 10, 1872.
Fig. I.
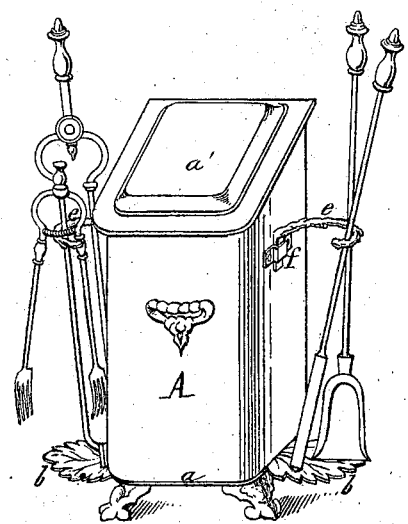
Fig. II.
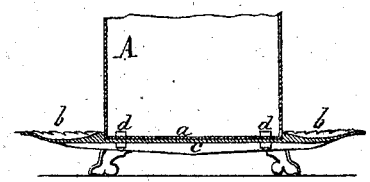
Fig. III.
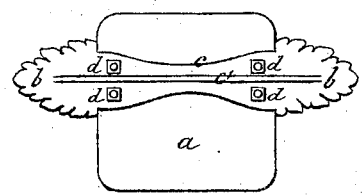
AM. PHOTO-LITHOGRAPHIC CO. N.Y. (OSBORNE'S PROCESS.)

UNITED STATES PATENT OFFICE.

EDGAR B. JEWETT, OF BUFFALO, NEW YORK.

IMPROVEMENT IN COMBINED COAL-BOX AND FIRE-IRON STANDARDS.

Specification forming part of Letters Patent No. 133,780, dated December 10, 1872.

*To all whom it may concern:*

Be it known that I, EDGAR B. JEWETT, of the city of Buffalo, in the county of Erie and State of New York, have invented certain Improvements in Combined Coal-Box and Fire-Iron Standard, of which the following is a specification:

Previous to my invention, devices for supporting the fire-irons, consisting of a bottom-rest, upright standards, and a curved arm projecting laterally therefrom, have been in common use.

My invention consists, first, of a combined coal-box and rest for fire-irons, consisting of a receptacle for coal, and a base-plate and curved arm both secured to the coal-box so as to form a support for the fire-irons; second, in the combination, with a coal-receptacle, of two plates or rests for supporting the fire-irons, and a connecting bridge-piece, formed in one piece and secured to the bottom of the coal-box, with the rests projecting from either side in such manner that said rests and bridge-piece can be readily detached from the coal-box, when the latter are required to be packed for transportation.

In the accompanying drawing, Figure I is a perspective view of my combined coal-box and rest for fire-irons; Fig. II is a fragmentary sectional elevation of the lower portion of the same; and Fig. III, a bottom-plan view thereof.

Like letters of reference designate like parts in each of the figures.

A represents the coal-box or fuel-receptacle of ordinary construction; *a* the bottom and *a'* the inclined cover thereof. *b b* represent two laterally-projecting rests or base-plates, one arranged on each side of the coal-box, near its bottom. They may be of any desired design or contour, and their outer edge is preferably raised above the main portion, so as to form a projecting rim or flange for better holding the implements placed thereon. *c* is the bridge-piece formed in one piece with the plates *b*, so as to connect the same under the bottom of the coal-box A, and preferably provided with a central stiffening-rib, *c'*. The platforms *b* are secured to the bottom of the coal-box by screw-bolts *d* passing through the bridge-piece *c*, whereby they are enabled to be readily attached and detached. *e* is the horizontal hook or curved arm secured to the side of the coal-box at a suitable distance above each platform *b*. It is not arranged directly above the latter but slightly back of the same, so that the implements placed on the platform lean against the hook *e* in a slightly-inclined position, as shown in the drawing. The hooks *e* are formed with a downwardly-projecting square, and fitting in a corresponding socket, *f*, secured to the side of the coal-box, to enable the same to be readily attached and removed.

The coal-box dispenses with the use of the ordinary standard that is employed as a support for the plate and arm *b e*. A set of these plates and arms are preferably arranged on opposite sides of the coal-box, as shown in the drawing, although a single set on one side may alone be used.

In my improved coal-box and rest for fire-irons the two devices which have heretofore existed separately are combined in one article, forming a neat, compact and convenient piece of furniture, which is produced at a small expense. When required to be packed for transportation, the base-plates *b* and curved arms *e* are detached from the coal-box, which is readily accomplished, as above described, and accidental breakage of these projecting parts prevented.

What I claim as my invention is—

1. As a new article of manufacture, a combined coal-box and rest for fire-irons, composed of the coal-box A, base-plate *b*, and curved arm *e*, substantially as hereinbefore set forth.

2. The combination, with a coal-box, of the base-plate *b* and connecting bridge-piece *c*, formed in one piece and secured to the bottom of the coal-box so as to be readily detachable therefrom, substantially as hereinbefore described.

EDGAR B. JEWETT.

Witnesses:
 EDWARD WILHELM,
 JOHN J. BONNER.